INVENTORS
WILFRED ROTH
JOHN OHMAN
BY Lippincott & Smith

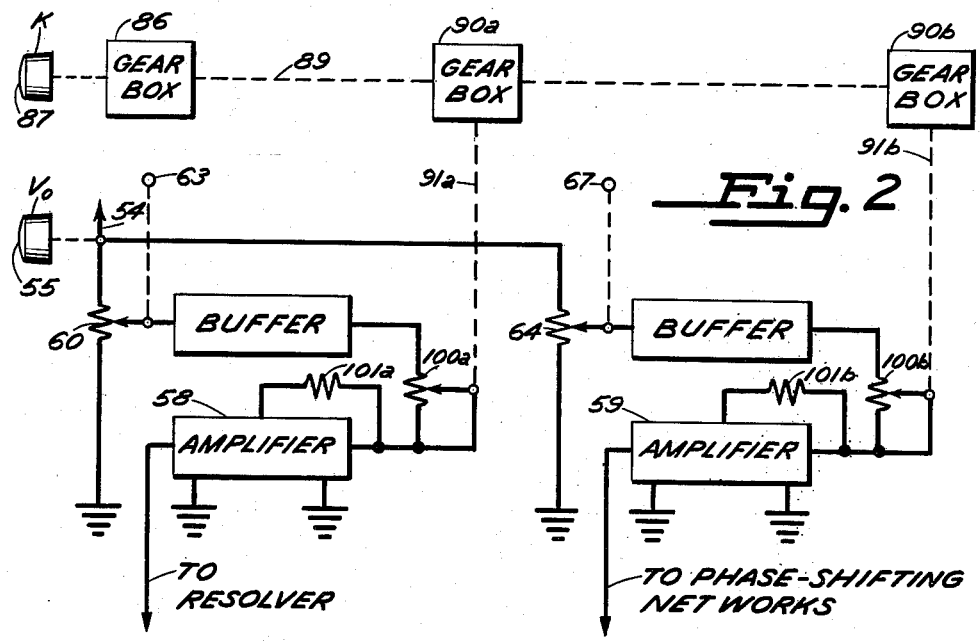
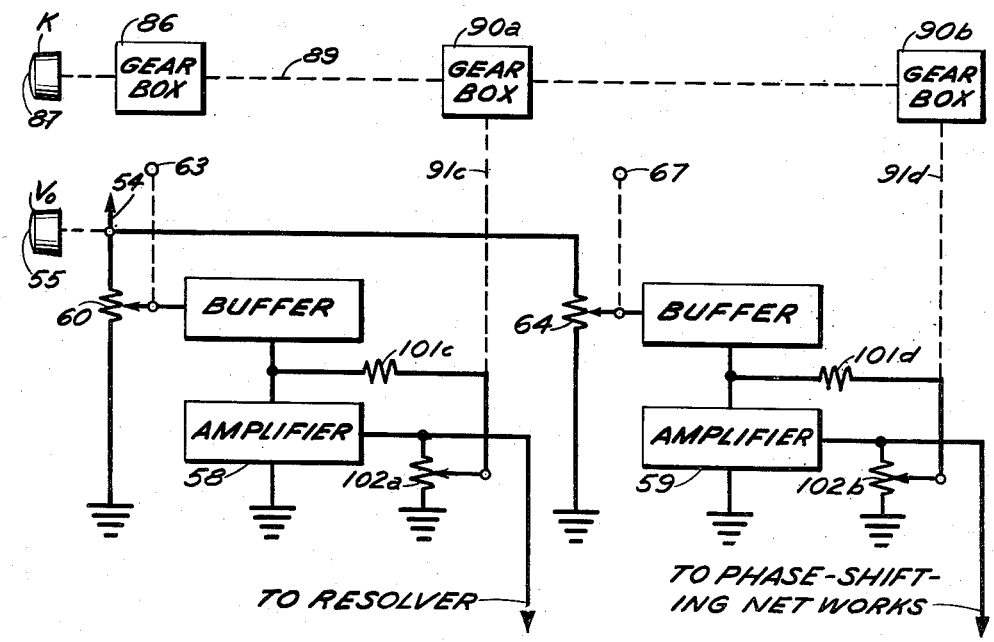

Patented Apr. 22, 1952

2,594,219

UNITED STATES PATENT OFFICE 2,594,219

APPARATUS FOR GEOPHYSICAL DISPLAY

Wilfred Roth, Cambridge, Mass., and John Ohman, Northport, N. Y., assignors to Geovision Incorporated, a corporation of New York Application December 21, 1949, Serial No. 134,262

30 Claims. (Cl. 315—24)

This invention relates to scanning generators, and specifically to generators for automatically computing and producing the electrical potentials necessary to trace on the screen of a cathode-ray tube equal-time loci for use in the display of geophysical data in accordance with the invention disclosed in the co-pending applications, Ser. No. 53,954, filed October 11, 1948, for "Method and Apparatus for Displaying Geophysical Data," and Ser. No. 65,883, filed December 17, 1948, for "Geophysical Display Apparatus," by Lu Garda Rieber, executrix of Frank Rieber, deceased.

In accordance with the inventions of the said co-pending applications, seismic waves are generated, usually by an explosion at a "shot point." These waves are propagated through a geological mass to be explored, and a portion of each of the waves is reflected at each interface between strata, within the mass, having different propagation characteristics. The reflected waves are picked up by a plurality of receptors or geophones arranged in accordance with some predetermined array which is carefully surveyed with respect to the shot point. The waves received by each geophone are used to modulate a cathode-ray beam, either directly as picked up by the geophone, or after being phonographically recorded and played back.

The elapsed time between the instant of the explosion and the arrival of the wavefront at any particular geophone is a function of the distance traveled by the wave to its point of reflection and back to the geophone and of the velocity of the wave through the media wherethrough it travels. With respect to any single geophone all of the information given by this time of arrival, provided the velocity be known, is the distance of the reflecting interface. This time, therefore, defines merely the locus of all interfaces which could return the waves at such an interval. If a number of loci are traced for different geophones disposed in a straight line through the shot point, some additional information is given; i. e., instead of knowing merely that the reflecting surface lies somewhere on a quasi-spherical locus, it can be inferred that the reflection occurs somewhere on a conical or cylindrical surface tangent to all of the loci corresponding to a specific wavefront. If at least one additional geophone is provided which does not lie along a common axis, the locus of the same wavefront with respect to this geophone as well will lie tangent to the reflecting interface, and, assuming that it be a plane surface, that plane will be the one which lies tangent to all of the loci mentioned.

Assuming constant velocity, where the distance of the reflecting interface is small in comparison to the distance between the shot point and the geophone, the loci are ellipsoidal. Where the distance becomes large, the ellipsoids approach more and more closely a spherical form, the center of the quasi-sphere relating to each geophone being on the mid-point between the shot point and the geophone, possibly with some vertical correction due to anomalous propagation through the so-called "weathering layer" overlying the mass to be explored. Such mid-points will hereinafter be referred to as the "adjusted centers" of the loci.

In accordance with the above-mentioned Rieber inventions a cathode-ray beam is directed at a display screen centering at a point representing to scale the position of the adjusted centers corresponding to the shot point and each of the geophones. A single cathode-ray beam may be used, and successively centered at each of the points mentioned, or a multi-gun cathode ray tube may be used. The ray is then deflected in expanding quasi-circular paths corresponding to the equal-time loci on the scale adopted for the presentation. The rays are then intensity modulated by the waves picked up from the respective geophones, either continuously where a multi-gun cathode ray tube is used, or successively by a sampling method where a single gun tube is employed. The loci may either be traced so as to be visible practically in their entirety, but with greater or less brilliance in accordance with their modulation by a pressure or rarefaction wave, or they may be almost entirely suppressed or latent and hence visible only at the wave peaks.

The loci within the earth are, of course, three dimensional; as traced upon the cathode ray screen they are the projections of the quasi-spherical loci upon a selected picture plane, and if this plane be chosen perpendicular to the strike of a reflecting surface, the loci corresponding to the given wavefront will reinforce and make the location of such surface evident to the viewer.

The actual position of the loci is known only if the velocity of propagation of the waves is known. The velocity in the surface layers can be determined by actual measurements. In the deeper strata the velocity increases, in general, with depth to a value which may be many times that in the surface layer; also it may suddenly change at an interface. In spite of these discontinuities and irregularities a good approximation may be obtained by assuming that the velocity increases linearly with depth.

It is well known that with such a velocity distribution in the earth the waves no longer travel in straight paths but are curved. The loci are still quasi-spherical, but their radii do not increase linearly with time nor do their centers remain fixed. Disregarding the elliptical correction, which may be separately applied, it can be shown that the radii of the loci at any interval of time $t$ following the explosion can be defined by the expressions $R_t = V_0(\sinh kt)/k$, where $V_0$ is the initial velocity at the explosion instant. The center of each locus will at the same time progress a distance $Z_t = V_0(\cosh kt - 1)/k$ in the direction of the velocity gradient.

In the above formulas $k$ is the velocity gradient, which may be expressed in feet per second per foot, if $V_0$ be expressed in feet per second.

In analyzing the data of seismic exploration of a hitherto unexplored territory, the value of $k$ is seldom known in advance. In an initial exploration of this character a reasonable value for $k$ may be assumed. If, however, the indirect method of exploration be used, i. e., where the data are phonographically recorded and can be played back onto the display repeatedly, a great deal can be learned by varying the assumed value of $k$, $V_0$, or both; when this is done, it may be found that when the right value is chosen, the display "comes into focus" as it were, giving a clear indication of the location of some significant interface. Since the locus is not a direct function of the velocity, but of the integrated velocity over the time $t$, such "coming into focus" will occur when the integrated values of velocity for the reinforcing loci are correct, even though the assumed smooth curve of velocity gradient be erroneous, and hence it follows that the effect may be observed for different values of $k$ on different portions of the display. In making the analyses it is therefore highly desirable that the quantity $k$ be continuously variable while the apparatus is in operation.

The primary object of the present invention is to provide apparatus which will compute and generate the deflecting potentials for producing loci of the type above mentioned; to provide means and methods whereby the quantities $V_0$ and $k$ can be fed into the equipment both initially and while in operation; to provide apparatus which will repeatedly generate families of loci coordinated in time with the rate of repetition of playback of recorded geophysical data; to provide apparatus for synchronizing the locus generation with the instant corresponding to the explosion and the elapsed time thereafter; and, in general, to provide such apparatus which is convenient to use and convenient to read when a satisfactory "focus" has been obtained upon the display.

Since the loci to be generated are substantially circular, the deflection is accomplished by applying quadrature components of a sinusoidal wave to the vertical and horizontal deflecting means, respectively, of the cathode-ray display tube. This invention is concerned primarily with the modulation of this wave with the proper functions of time to trace the loci in accordance with the formulas above given.

A master oscillator supplies the sinusoidal wave, preferably at an amplitude sufficient to give a greater deflection than the maximum actually required. The wave is then preferably passed through a voltage divider tapped so that a proper scale factor may be selected to display either the data referable to the entire geological mass from which recognizable waves can be received and recorded, as to give a general picture of the entire volume to be explored, or a portion of such mass, displayed to a larger scale, so that details may more readily be recognized. If desired, of course, the master oscillator may be arranged to deliver a fixed voltage of the maximum value required and the scale factor selector may be omitted. Whichever of these methods be chosen, the oscillations are fed to a potentiometer from which there is taken off a portion of the oscillator voltage which is proportional, on the scale selected, to the known or assumed value of $V_0$.

The voltage supply from the potentiometer is modulated mechanically. For the purpose of such modulation the quantity $t$ is represented by the position of the shaft of a constant speed motor, which may be geared down, if necessary, in order to give one complete revolution of the shaft for the maximum time interval $t$ within which recognizable seismic waves can be received. If the seismic waves have been recorded, this shaft also drives the record which may be film, wax recording, magnetic recording or, in fact, any of the known types of recording of sound or other elastic waves. If direct display is to be used, without the intermediate recording step, a clutch is interposed in the drive between the shaft whose motion represents the quantity $t$ and the remainder of the equipment next to be described, the clutch engaging at the instant that the explosion occurs.

Beyond the clutch there is interposed a variable ratio drive, which may be of the well known friction cone type or other equivalent arrangement, and means are provided for varying the rate of rotation of the output shaft of this drive proportionally to the constant $k$ which represents the velocity gradient within the mass. Through the variable ratio drive, and preferably through another clutch or a zero referrer whereby the position of the equipment can be set initially to correspond with the instant of the explosion $t=0$, there are provided means for driving the take-off contacts of a pair of potentiometers which are so wound or the contacts of which are so driven that with a revolution of the shaft proportional to $kt$, the portion of the applied voltage picked off from the potentiometers will be proportional respectively to $\sinh kt$ and $\cosh kt - 1$. These two potentiometers are fed from the $V_0$ potentiometer already referred to, if necessary, through buffer amplifiers so as to prevent loading effects upon the $V_0$ potentiometer. Means are provided for multiplying the outputs of the two potentiometers by the factor $1/k$; this quantity may be either greater or less than unity. This latter means may either precede or follow electrically the potentiometers; in either case they are mechanically interlocked with the $k$ adjustment of the variable speed drive.

The output of the $\sinh kt$ potentiometer, multipled by the factor proportional to $1/k$, is passed through a phase splitting network or networks which provide the quadrature components to be applied to the vertical and horizontal deflecting plates of the display tube. These components are preferably fed into summing networks which add to these two components the potentials necessary to give the proper displacement to the deflection center in accordance with the equation for $Z_t$ given above.

These latter potentials are derived from the output of the amplifier fed from the cosh $kt-1$ potentiometer. This amplifier feeds a resolver, which may be of the well-known crossed coil type. The resolver is provided with a control for setting the coils in accordance with the direction of the velocity gradient. If this gradient is directly downward, no horizontal displacement of the center of deflection is necessary, and the resolver is therefore so set that the pickup from one of its crossed coils is a maximum while the other is zero. If the direction of the gradient is displaced from the vertical, however, the setting of the resolver will be so adjusted that the coils pick up, respectively, potentials proportional to the cosine and sine of the angle of deviation from the vertical.

The cosine coil of the resolver feeds a simple rectifier which is provided with an integrating circuit feeding the summing network connected with the vertical deflecting system of the display tube. The sine coil of the resolver feeds a phase sensitive rectifier, the output of which is "positive" or "negative" in accordance with whether the angle of deviation from the vertical be to the right or left as viewed in the picture plane. The output of the phase sensitive rectifier feeds, through the same summing network that carries the sinusoidal deflecting components, to the horizontal deflecting system of the display tube. The result is a deflection of the cathode-ray beam in accordance with the formulas given above.

A more detailed description of the invention follows, explained further by the accompanying drawings, wherein:

Fig. 2 is a redrawing of a portion of the circuit shown in Fig. 1 and showing one method of adjusting the gain of the amplifiers to be equal to $1/k$; the necessary buffer stages being indicated in this drawing;

Figs. 3 and 4 are drawings similar to Fig. 2 showing other methods of adjusting the gain to the value $1/k$.

Figure 1:
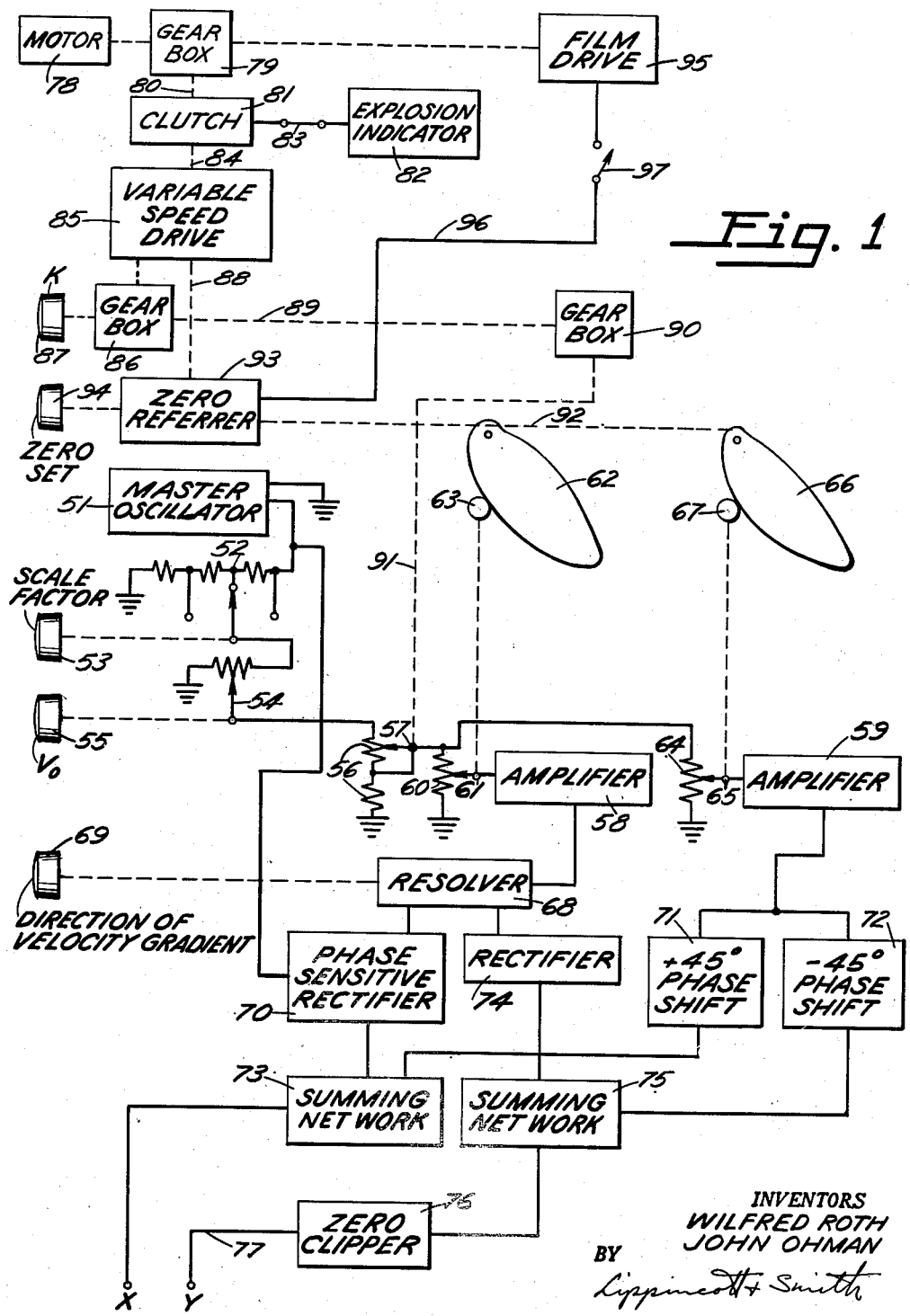
Fig. 1 is a block diagram of the entire apparatus for generating the scanning potentials, various buffer amplifiers being omitted in this drawing in order to simplify its construction and make the inter-relationship between the various potentials developed more apparent.

The embodiment of this invention illustrated in Fig. 1 uses, as the display equipment, a multigun cathode-ray tube provided with separate modulating and deflecting circuits for each electron gun. The signals received directly from the geophone channels or those derived from the phonographically reproducible record are amplified. In the direct system, the amplification increases with time, since the signal strength usually decreases rapidly as reflections return from layers further away from the shot-point. In the recorded form, this signal variation has been similarly equalized in the recording process.

A series of suitable filters may be provided for each geophone channel, a particular filter to be selected for the display either on the basis of previous knowledge of the optimum filter characteristics or from inspection of the display for various filter settings, as more fully described in the co-pending application, Ser. No. 53,954, filed October 11, 1948, by Lu Garda Rieber, executrix of Frank Rieber.

Mixing circuits for the various channels may also be included, which would permit predetermined portions of the outputs of selected geophones to be combined; the combined outputs being applied to the respective guns of the cathode-ray tube. Such mixing procedures are well known in the art and will therefore not be described in detail.

On the display screen the origins of the loci to be generated will start from positions, corresponding on a selected scale to the midpoint positions; the scale factors for the horizontal and vertical components may be different.

Suitable D. C. potentials applied to the deflection plates of a cathode-ray tube serve to position the wave-front origins at these midpoints. It should be noted that in some instances the horizontal distances between the receptors are not identical. In such instances, the horizontal deflection voltages, determining the loci origins, position these origins to present an arrangement on the screen proportional to the actual spread dimensions.

In the block diagram of Fig. 1 the computer is intended for displaying a vertical cross-section through the earth, for the case of constant velocity gradient. It is thus necessary to derive voltages as a function of time which are proportional to the radii ($R_t = V_0 (\sinh Kt)/K$) and the distances of the circle centers from their origins ($Z_t = V_0 \cosh Kt - 1)/K$).

The basic scanning frequency is developed by a master oscillator 51, which is preferably controlled to give constant frequency and constant voltage. Preferably this voltage is several times that required to give full scale deflection of the cathode-ray beam. The output of the oscillator is fed into a voltage divider 52, whereby, by means of a knob 53, the basic scale at which the presentation is to be made can be set. For the deepest explorations, the knob 53 would be set to minimum voltage, so that after the final operations thereon, the deflection would just fill the screen of the viewing scope. For shallower explorations, a higher voltage would be used, so that the growth of the scanning radius would be more rapid, the entire screen would be swept in a shorter period, and the picture of the shallower strata would be shown to a larger scale with the detail, consequently, more evident.

The potential derived from the voltage divider 52 is fed through a potentiometer 54 for setting the initial rate of growth of the scanning radii; i. e., the setting of this potentiometer, by means of the knob 55, is dependent upon the value of $V_0$ in the area to be explored.

The voltage divider 52 and potentiometer 54 both operate to vary the voltage derived from the oscillator. By calibrating the divider 52 in fixed "scale" increments, however, multiple calibrations reading directly the initial velocities can be provided in connection with the knob 55, which simplifies making the analyses.

The alternating voltage derived from potentiometer 54, the amplitude of which is proportional to the initial velocity $V_0$ is further adjusted to be inversely proportional to K. In the embodiment illustrated, division by K is accomplished by means of an Ohm's law divider 56, the movable contact arm 57 short-circuiting a section of the resistor in accordance with variations in the velocity gradient K. The output voltage of this divider will be the input voltage times the inverse of $(1+R)$, where R is the ratio of the variable resistor to the constant resistor. The two resistors are so dimensioned that an adequate range of velocity gradient values, such as, for instance, from 0.01 to 2 feet-per-foot-per-second, can be covered.

This division by K may be done in various other ways. As illustrated in Fig. 2, the two subsequent amplifiers 58 and 59—their function will be explained later—may have variable resistors, 100a and 100b, respectively, in their input leads and negative feedback loops, each containing a resistor, 101a and 101b, respectively. Provided amplifiers 58 and 59 have high gains, their outputs will vary as the reciprocal of the value of the respective resistor, 100a or 100b, in the input lead, controlled to be proportional to the value of K selected for the particular display. The values of resistors 100a and 100b are set by knob 87, through gear box 86, shaft 89, gear boxes 90a and 90b, and shafts 91a and 91b. The other circuit elements, shown in Fig. 2, are identical with those in Fig. 1, designated by the same numerals.

Another method consists in so designing the negative feedback amplifiers 58 and 59 that their overall amplification factor is proportional to the inverse of the feedback factor, which condition will obtain provided the product of the amplication factor times the feedback factor is much larger than unity. The negative feedback factor is then controlled by a mechanical link to be proportional to the value of K selected for the particular presentation.

In Fig. 3 the feedback voltages are supplied by potentiometers 102a and 102b, adjusted by knob 87, gear box 86, shaft 89, gear boxes 90a and 90b, and shafts 91c and 91d. The other circuit elements shown are identical with those illustrated in Fig. 1 and are designated by the same numerals.

Alternatively, we calibrate knob 55 in units of $V_0/K$ and dimension potentiometer 54 to accommodate a suitable range, such as 4,000 to 8,000 for $V_0$ and 0.01 to 1.60 for K.

The next step required is the multiplication of the voltage proportional to $V_0/K$ by $\cosh Kt-1$ for the centering of the circles and the independent multiplication of the voltage proportional to $V_0/k$ by $\sinh Kt$ for the radii of the circles. Two separate channels will thus be required.

Potentiometer 60 and moving contact arm 61 cooperate in the generation of the $\cosh Kt-1$ voltage. Potentiometer 60 may be a non-linear potentiometer designed to produce this function for a uniform motion of the contact arm 61. Alternatively, potentiometer 60 may be linear and the contact arm 61 controlled by a cam follower 63 guided by a uniformly-rotating, suitably-shaped cam 62 to be displaced as $\cosh Kt-1$. Since the function $\cosh Kt$ is steep, i. e., a large range has to be covered within a comparatively short time, it is desirable to have a suitably-shaped cam cooperating with a non-linear potentiometer. This reduces the non-linearity of each element.

Potentiometer 64, contact arm 65, rotating cam 66 and cam follower 67 cooperate similarly to produce the $\sinh Kt$ voltage.

Figure 4:
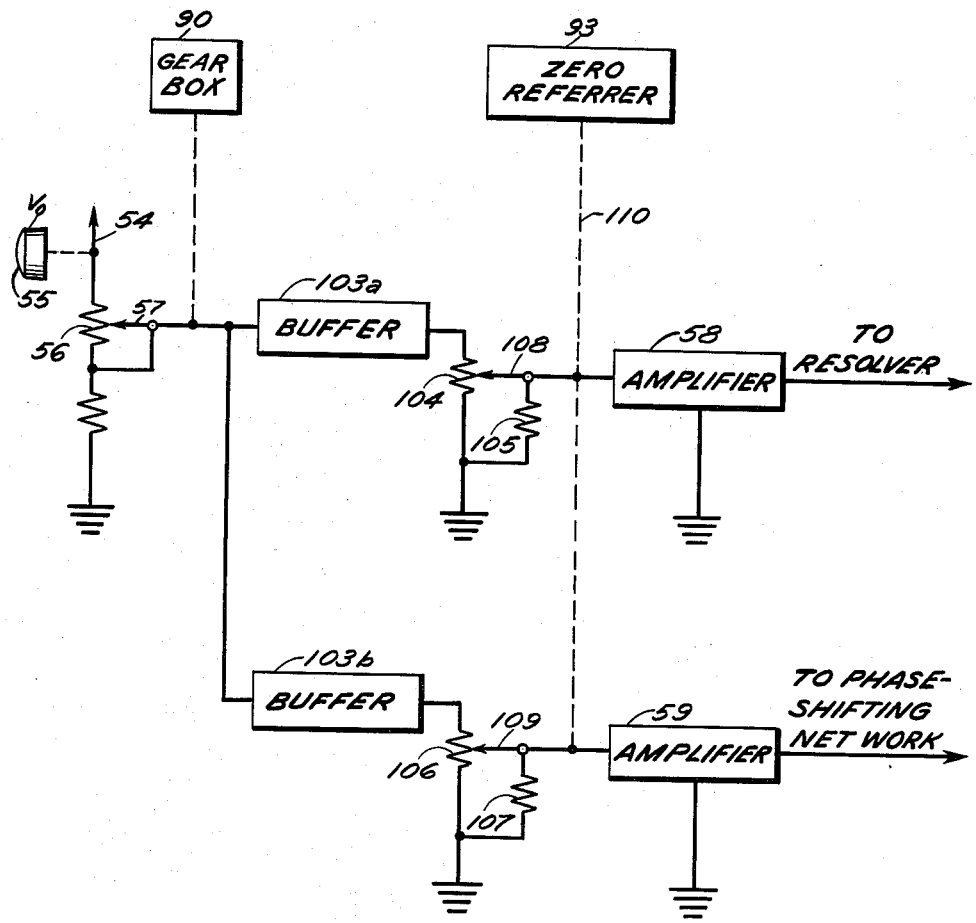

Alternatively, two loaded potentiometer circuits, illustrated in Fig. 4, may be used to generate the $\sinh Kt$ and $\cosh Kt-1$ functions. Two buffer stages 103a and 103b separate the voltage divider potentiometer 56 from the loaded potentiometers 104, 105 and 106, 107, respectively. The potentiometer arms 108 and 109 are both controlled by shaft 110 to be displaced linearly with time by amounts proportional to $Kt$. This arrangement involves linear potentiometers only, and though rational functions will be generated by the loaded potentiometers, the $\sinh Kt$ and $\cosh Kt-1$ functions, respectively, can be approximated closely by suitably dimensioning the ratios of the cooperating resistors 104, 105 and 106, 107.

It will be seen from the preceding discussion that the output of amplifiers 58 and 59 are proportional, respectively, to the functions determining positions of the circle centers and the radii of the circles at any given instant of time.

The output of amplifier 58 is fed to an electrical resolver 68. The function of the resolver is to take account of the direction of the velocity gradient so that the motion of the center of the deflection circles will coincide therewith. The resolver 68 comprises a primary coil and two secondary coils at right angles with respect to one another. Knob 69 controls the angular setting of the secondary coils with respect to the primary coils, thereby determining the angle in which the centers of the circles progress compared to the vertical; this direction is set by knob 69 to be the direction of the velocity gradient.

When the gradient is vertical, one of the secondaries will be at right angles to the primary, and will pick up no component; this is the horizontal deflection voltage. The other secondary will pick up the maximum voltage from the primary; this component will control the vertical movement of the circle centers. At any position the secondary coils will have induced voltages proportional to the sine and cosine of the primary voltage, respectively.

The horizontal centering function is fed to a phase-sensitive rectifier 70 to account for deviations to either side from the vertical. Since the structure and operation of both the resolver and the phase-sensitive rectifier are well known in the art, their structure is not shown in detail.

The centering voltage for the circles can, alternatively, be derived from a D. C. source, instead of from the master oscillator 51. Suitable circuitry for varying the D. C. voltage to be proportional to $V_0(\cosh Kt-1)/K$ will be obvious to those skilled in the art, particularly in view of the preceding disclosure. A resolver for generating horizontal and vertical components may also be included. However, in some instances provisions for vertical displacement of the circle centers may be adequate and the horizontal component may then be omitted.

The output of amplifier 59 is fed to two forty-five degree phase shifting networks, 71 and 72, to secure the ninety degree out-of-phase voltages required for the circular sweep.

The output of phase shifting network 71 is combined with the output of the phase-sensitive rectifier 70 in a summing network 73, while the output of phase shifter 72 is combined with the output of rectifier 74, deriving its input from the resolver, in summing network 75.

The output of the summing network 75 is fed through a zero clipper 76 to the vertical deflection plates. The zero clipper may be a diode connected across the output in such sense as effectively to short-circuit "positive" swings of the deflecting potential. The clipped oscillations feed through lead 77 to the vertical deflecting plates. The origins of the loci are always at or near the line corresponding to the surface line of the earth, and deflections above this line would only be confusing. By clipping the potentials which would deflect the beams above the surface line, the rays are forced to trace a line corresponding to the earth's surface, or some datum line, which adds legibility to the diagrams traced by the rays.

It is frequently preferable that the cathode-ray oscilloscope used for the display have a persistent type screen, whereon the trace of the rays remains visible for a considerable period. Where the loci are traced directly from the earth waves, as has just been described, the procedure would normally be to photograph the face of the oscilloscope as the shot is taken so as to make a permanent record.

The primary drive of the mechanical equipment is provided by a constant-speed motor 78 which operates through a gear box 79 to drive a shaft 80 connected to a clutch 81. The clutch is engaged by an impulse from the explosion indicator 32 if the waves are taken directly from the receptor channels. In this case the switch 83 is closed and the same impulse that fires the shot operates to release the explosion indicator and to start the operation of the device.

The shaft 84 operates a variable speed drive 85 such as a continuously variable friction gear.

The constant angular speed of shaft 84 as driven by the constant-speed motor and started by the explosion indicator serves to introduce the independent variable, time, into the system, the angle through which shaft 84 having rotated being proportional to time elapsed since the instant of explosion.

The angular speed of the variable speed-drive 85 is controlled through a gear box 86 by knob 87, having a scale calibrated in units of K, where K is multiplying factor of the angular speed delivered by the variable speed-drive 85. Thus, the shaft 88 will rotate at an angular speed proportional to K, and the angle through which it will have rotated at any particular instant since the beginning of the operation will be proportional to $Kt$.

Setting knob K will also, through shaft 89, gear box 90 and mechanical coupling 91, correctly position the contact arm 57 of potentiometer 56 as previously explained.

Shaft 88 drives shaft 92 through a zero referrer 93. This is a clutch, operated by a knob 94, whereby the shaft 92 may be set at its zero position with respect to the shot instant, prior to the operation of the device.

The two cams 62 and 66 are mounted on shaft 92 so that $Kt$ will be the argument of the functions generated by these two cams and the associated potentiometers 60 and 64, respectively, as explained before.

When it is desired to operate the device from phonographic recordings of the seismic waves, the switch 83 is open, disconnecting the explosion indicator 82. The shaft of the motor 78 is extended through the gear box 79 and utilized to drive the loop-shaped film or other repetitively scannable record through the drive mechanism 95. The recorded impulse indicating the moment of explosion is used to initiate a pulse in the lead 96—the switch 97 being closed—which operates the clutch in the zero referrer 93, starting rotation of the cams 62 and 66 simultaneously with the arrival of this pulse. Enough of a "trailer" is used on the record so that the cams always complete a full revolution before the record starts to repeat. The shaft 92 then stops until it is picked up again by the next starting pulse. The zero referrer is preferably automatic. A relay, operated by the explosion signal, or the recorded impulse thereof, shifts the clutch into its engaging position, the relay being released by a signal at or near the end of the film or from a suitably-positioned stop on the film drive. A spring urges the shaft 92 towards its starting position. The spring takes over as soon as the relay permits disengagement of the clutch and the resetting of the shaft 92 to its starting position is completed before the same or another explosion signal causes closing of the relay.

It is not necessary that the records be run at the same speed at which they were taken. Since a somewhat higher frequency spectrum than that originally recorded is more easily manipulated, advantage may be taken of the frequency multiplication to be obtained by playing the recordings back at a speed higher than that used when the reflection signals were first received. The master oscillator 51 must oscillate at a frequency supplying a sufficient number of loci within the play-back time interval to give adequate resolution.

As pointed out before, each family of circles will have to start at the equivalent mid-point position for the receptor intensity-modulating this family. Suitable and adjustable D. C. potentials for vertical and horizontal positioning of the circle origins will have to be provided.

Phonographically reproducible records permit re-scanning of the records while the various constants, such as initial velocity, magnitude and direction of velocity gradient, filter setting and mixing, are varied and the images obtained are observed on the screen.

It will be apparent that the displacements on the screen, or the deflection voltages, should be proportional to those of the acoustic waves in the earth. However, the instantaneous values of the velocity do not have to be identical with the actual velocities in the earth, as long as the average value to the distance reached is proportional thereto. This may cause part of the display to stand out clearly for a particular setting of the independent variables while another region will be comparatively blurred but will clear up for another setting of the variables. It is indicated that the setting resulting in the clearest and most coherent image will be the optimum setting for the particular region unless definite indications making these values unreasonable or unlikely from other considerations are available.

It is to be understood that the details of the apparatus here described for generating and synchronizing the various voltages are only examples of devices that may be used for the purpose. The equipment described here is illustrative and should not be construed as limiting. It is desired that the invention be construed as broadly as possible within the scope of the following claims.

We claim:

1. A generator of scanning potentials comprising a master oscillator producing sinusoidal waves, means for modulating a portion of said waves in accordance with the function $\sinh kt$, where $t$ is time elapsed after a given instant and $k$ is a selected constant, means for modulating a second portion of said wave in accordance with the function $\cosh kt - 1$, means for deriving quadrature components of said first modulated portion, means for rectifying said second modulated portion, and means for adding said rectified wave to one of said quadrature components to produce a deflecting potential.

2. Apparatus in accordance with claim 1 including a resolving device fed by said second modulated wave portion to provide components thereof proportional respectively to the sine and cosine of a selected angle, a rectifier fed by the sine component thereof, a phase sensitive rectifier fed by said cosine component thereof, and means for adding potentials proportional to the outputs of said rectifiers to said quadrature components respectively to produce two different but related scanning potentials.

3. Apparatus in accordance with claim 1 including means for remodulating each of said portions in accordance with the factor $1/k$.

4. Apparatus in accordance with claim 1 including means for remodulating each of said portions in accordance with the factor $1/k$, and means for simultaneously varying the quantity $k$ in each of said modulating means.

5. A generator of scanning potentials comprising means for generating sinusoidal electrical oscillations, means for modulating said oscillations in accordance with a function of time, means for deriving substantially equal quadrature components of said modulated wave, means for deriving a direct potential varying in accordance with a function of time, and means for adding said direct potential to at least one of said quadrature components to provide potentials which will deflect a cathode-ray beam in a spiral path about a shifting center of deflection.

6. Apparatus in accordance with claim 5 including means for adding to each of said quadrature components in selected proportions direct potentials varying in accordance with said second mentioned function of time.

7. Apparatus in accordance with claim 5 wherein said first and second mentioned functions of time are different.

8. A generator of scanning potentials comprising a shaft and means for driving the same at a substantially constant speed, a variable ratio gear driven by said shaft, a second shaft driven by said gear at a rate related to that of said first shaft by a factor $k$, a generator of sinusoidal waves, a non-linear potentiometer fed by said generator and having a contact arm actuated by said second shaft, a variable gain amplifier fed from said contact arm, and means for simultaneously varying the rate of rotation of said second shaft and the gain of said amplifier in inverse proportion.

9. A generator of scanning potentials in accordance with claim 8 wherein the portion of the total resistance thereof included between one end and the contact arm is proportional to the hyperbolic sine of the angle of rotation of said second shaft.

10. A generator of scanning potentials comprising a shaft rotatable through equal angles in equal times, a variable ratio gear driven by said shaft, a second shaft driven by said gear at a rate differing from that of said first shaft by a factor $k$ determined by the ratio of said gear, a pair of non-linear potentiometers having contact arms actuated by said second shaft, a generator of sinusoidal electrical oscillations connected to feed both of said potentiometers, means connecting to said contact arms for multiplying the sinusoidal potentials supplied thereby by a factor proportional to $1/k$, rectifying means fed by one of said multiplying means, phase splitting means fed by the other of said multiplying means to provide substantially equal quadrature components of said oscillations, and means for adding the output of said rectifying means to at least one of said quadrature components.

11. Apparatus in accordance with claim 10 wherein said last mentioned means comprises means for adding portions of the output of said rectifying means to both of said quadrature components in amounts proportional respectively to the sine and cosine of an adjustable angle.

12. Apparatus in accordance with claim 10 wherein said contact arms subtend portions of the total resistance of said potentiometers proportional respectively to the hyperbolic cosine and the hyperbolic sine of the angle of rotation of said second shaft.

13. Apparatus in accordance with claim 10 wherein said multiplying means constitute variable gain amplifiers.

14. A generator of scanning potentials comprising an adjustable speed shaft, means for driving said shaft, a non-linear potentiometer having a contact driven by said shaft, a generator of sinusoidal oscillations of substantially constant value connected to feed said potentiometer, phase splitting means fed by said potentiometer, to provide quadrature components, and means for varying the amplitude of said components in inverse proportion to the speed of said shaft.

15. A generator of scanning potentials in accordance with claim 8 wherein the resistance of said potentiometer, included between one end and the contact arm, is proportional to the hyperbolic cosine of the angle through which said second shaft has rotated minus unity.

16. A generator of scanning potentials comprising a shaft, a means for driving said shaft at a substantially constant speed, a variable ratio gear driven by said shaft, a second shaft driven by said gear at a rate related to that of said first shaft by a factor $k$, a generator of sinusoidal waves, means for multiplying the generator output by $1/k$, a potentiometer fed by said multiplier and having a contact arm actuated by said second shaft, and a resistor connecting said contact arm with one potentiometer terminal.

17. A generator of scanning potentials in accordance with claim 16, comprising means for varying $k$.

18. A generator of scanning potentials in accordance with claim 16 wherein the multiplying factor introduced by said potentiometer in conjunction with said resistor is proportional to the hyperbolic sine of the angle through which said second shaft has rotated.

19. A generator of scanning potentials in accordance with claim 16 wherein the multiplying factor introduced by said potentiometer in conjunction with said resistor is proportional to the hyperbolic cosine of the angle of rotation of said second shaft minus unity.

20. A generator of scanning potentials comprising a shaft and means for driving the same at a substantially constant speed, a variable ratio gear driven by said shaft, a second shaft driven by said gear at a rate related to that of said first shaft by a factor $k$, a cam on said second shaft, a generator of sinusoidal waves, a linear potentiometer fed by said generator having a contact arm positioned by said cam, and a variable gain amplifier fed from said contact arm.

21. A generator of scanning potentials in accordance with claim 20 comprising means for simultaneously varying the rate of rotation of said second shaft and the gain of said amplifier in inverse proportion.

22. A generator of scanning potentials in accordance with claim 20 wherein said cam displaces said contact arm by a distance proportional to the hyperbolic sine of the angle through which said second shaft has rotated.

23. A generator of scanning potentials in accordance with claim 20 wherein said cam displaces said contact arm by a distance proportional to the hyperbolic cosine of the angle through which said second shaft has rotated minus unity.

24. A generator of scanning potentials comprising an adjustable speed shaft, means for driving said shaft, a cam on said shaft, a linear potentiometer having a contact arm positioned by said cam, a generator of sinsuoidal oscillations having an adjustable amplitude connected to feed said potentiometer, phase splitting means fed by said potentiometer to provide quadrature components and means for varying the adjustable amplitude in inverse proportion to the speed of said shaft.

25. A generator of scanning potentials in accordance with claim 24 wherein said cam moves said contact arm by distances proportional at any instant to the hyperbolic sine of the angle through which said shaft has rotated.

26. A generator of scanning potentials in accordance with claim 24 wherein said cam moves said contact arm by distances proportional at any instant to the hyperbolic cosine of the angle through which the shaft has rotated minus unity.

27. A generator of scanning potentials in accordance with claim 24 wherein said generator of sinusoidal oscillations having an adjustable amplitude comprises a potentiometer having a fixed contact arm and an adjustable contact arm electrically connected to said adjustable contact arm, said adjustable contact arm being adjustable simultaneously with said adjustable speed shaft.

28. Apparatus in accordance with claim 1, including means for modulating said sinusoidal waves in accordance with the factor $1/k$.

29. A generator of scanning potentials in accordance with claim 24 including means for adding a voltage continuously increasing with time to at least one of said quadrature components.

30. A generator of scanning potentials in accordance with claim 24 wherein said cam moves said contact arm by distances proportional at any instant to the hyperbolic sine of the angle through which said shaft has rotated, and means for adding a voltage proportional to the hyperbolic cosine of the angle through which said shaft has rotated minus unity, to at least one of said quadrature components.

WILFRED ROTH.
JOHN OHMAN.

REFERENCES CITED

The following references are of record in the file of this patent:

UNITED STATES PATENTS

| Number | Name | Date |
|---|---|---|
| 1,470,696 | Nicolson | Oct. 16, 1923 |
| 2,307,237 | Rea et al. | Jan. 5, 1943 |
| 2,408,415 | Donaldson | Oct. 1, 1946 |
| 2,436,827 | Richardson | Mar. 2, 1948 |
| 2,449,792 | Snyder, Jr. | Sept. 21, 1948 |